(12) United States Patent
Thompson et al.

(10) Patent No.: US 10,036,891 B2
(45) Date of Patent: Jul. 31, 2018

(54) VARIABLE TRANSPARENCY HEADS UP DISPLAYS

(75) Inventors: Peter Thompson, Oxenhope (GB); Antony Michael Dove, Queensbury (GB)

(73) Assignee: DISH Technologies L.L.C., Englewood, CO (US)

( * ) Notice: Subject to any disclaimer, the term of this patent is extended or adjusted under 35 U.S.C. 154(b) by 809 days.

(21) Appl. No.: 12/902,320

(22) Filed: Oct. 12, 2010

(65) Prior Publication Data
US 2012/0086624 A1 Apr. 12, 2012

(51) Int. Cl.
*G09G 5/00* (2006.01)
*G02B 27/01* (2006.01)

(52) U.S. Cl.
CPC ...... *G02B 27/017* (2013.01); *G02B 2027/014* (2013.01); *G02B 2027/0118* (2013.01); *G02B 2027/0138* (2013.01)

(58) Field of Classification Search
CPC .......... G06F 3/005; G06F 3/012; G06F 3/048; G06F 3/041; G09G 2340/12; G09G 5/00; G02B 27/0172; G02B 27/017; G02B 2027/0118; G02B 2027/0145; G02B 2027/0147
(Continued)

(56) References Cited

U.S. PATENT DOCUMENTS 4,805,988 A   2/1989  Dones 6,456,438 B1 * 9/2002  Lee .................. G02B 27/01
                                            359/630
(Continued)

FOREIGN PATENT DOCUMENTS

EP           2628042 B1    10/2014

OTHER PUBLICATIONS

Imagine: Your Direction and location, Video, Gaming, E-mail, the Internet and Nght Vision right in "Front of Your Eyes" Acoustic Vision: THe Multi-Billion Dollar Head WOrn Display Market Oppurtunity that Can DOminante by working with Phones, Media players, Net Book and Laptops filed Feb. 28, 2010 with U.S. Appl. No. 61/308,973.*

(Continued)

*Primary Examiner* — Nalini Mummalaneni
*Assistant Examiner* — Robert Michaud
(74) *Attorney, Agent, or Firm* — Seed IP Law Group LLP

(57) ABSTRACT

A heads up display presents images to a user. A background is located behind the heads up display. The heads up display is operable to vary the transparency of the images such that images alone are viewable, the background is viewable through the images, or the background is viewable but the images are not. The heads up display may vary the transparency of the images by varying the transparency of a display screen. Alternatively, the heads up display may record the background using a visual recording element and may combine the recorded background with the images such to overlay the images over the recorded background. The, the display screen may display the images. Alternatively, the display screen may be a projection screen upon which an image projector projects the images. The heads up display may also include an illumination element that illuminates the background when not sufficiently illuminated.

19 Claims, 6 Drawing Sheets

(58) Field of Classification Search
USPC .......................................... 345/8, 7; 349/11
See application file for complete search history.

(56) References Cited

U.S. PATENT DOCUMENTS

| | | | |
|---|---|---|---|
| 2002/0044152 A1* | 4/2002 | Abbott, III | G06T 11/00 345/629 |
| 2004/0042086 A1 | 3/2004 | Beystrum et al. | |
| 2007/0243863 A1* | 10/2007 | Hong | G02B 27/017 455/418 |
| 2008/0218434 A1* | 9/2008 | Kelly | G02B 27/01 345/8 |
| 2008/0218436 A1 | 9/2008 | Lipscomb | |
| 2010/0014155 A1* | 1/2010 | Hayashi | 359/380 |
| 2010/0067118 A1* | 3/2010 | Takahashi | G02B 27/01 359/633 |
| 2010/0141555 A1* | 6/2010 | Rorberg | G02B 27/017 345/8 |
| 2010/0295946 A1* | 11/2010 | Reed | H05B 37/0227 348/164 |
| 2011/0025702 A1* | 2/2011 | Lionti | G09G 3/342 345/589 |
| 2012/0062444 A1* | 3/2012 | Cok | G02B 27/0172 345/8 |
| 2012/0062445 A1* | 3/2012 | Haddick et al. | 345/8 |
| 2012/0187838 A1* | 7/2012 | Hanna | G06K 9/2027 315/76 |

OTHER PUBLICATIONS

International Search Report and Written Opinion for corresponding International Application No. PCT/EP2011/067751, dated Feb. 2, 2012, 22 pages.
Canadian Office Action for corresponding Canadian Application 2,813,512; dated Jul. 22, 2014; 2 pages.
Canadian Office Action for corresponding Canadian Application 2,813,512; dated Mar. 31, 2015; 4 pages, dated Jun. 26, 2015.

\* cited by examiner

VARIABLE TRANSPARENCY HEADS UP DISPLAYS

FIELD OF THE INVENTION

This disclosure relates generally to heads up displays, and more specifically to heads up displays that present content with variable transparency to allow users to focus on the content, a background or both at a given time.

SUMMARY

The present disclosure discloses systems and methods for providing variable transparency heads up display devices. A heads up display presents one or more images to the eyes of a user. A background is located behind the heads up display opposite the user. The heads up display is operable to vary the transparency of the images such that either the images are non-transparent and opaque such that the images alone are viewable by the user, the images are partially transparent such that the background is viewable by the user through the images, or the images are completely transparent such that the background is viewable by the user and the images are not viewable. The heads up display may vary the transparency of the images in response to input received from the user. As such, the user may efficiently and simply operate the heads up display to switch between viewing presented content, the background, and/or combinations thereof without removing the head mountable viewing device and possibly without pausing or stopping the content if the user so desires.

In various implementations, the heads up display may vary the transparency of the images by varying the transparency of a display screen. As such, the background may be viewable to the user by enabling the user to see through the display screen. In various other implementations, the heads up display may record the background using a visual recording element and may combine the recorded background with the images such that the images are overlaid over the recorded background. In such implementations, whether or not the background is viewable, partly viewable (partly obscured by the images), or not viewable (fully obscured by the images) depends on the transparency of the images overlaid over the recorded background. The background recorded utilizing the visual recording element maybe a combination of background images recorded multiple visual recording elements such that the viewing area of the combination is greater than the viewing area than any of the individual background images.

In some implementations, the display screen may display the images. In such implementations the display screen may comprise a display device such as a liquid crystal display (LCD) device. However, in other implementations the display screen may be a projection screen upon which an image projector projects the images.

The heads up display may also include an illumination element that is operable to illuminate the background. The illumination element may be controlled by a light sensor such that the illumination element only illuminates the background when the background is insufficiently illuminated for viewing, such as when an illumination level of the background is below a threshold value. In some implementations, the illumination element may be an infra red illumination element.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
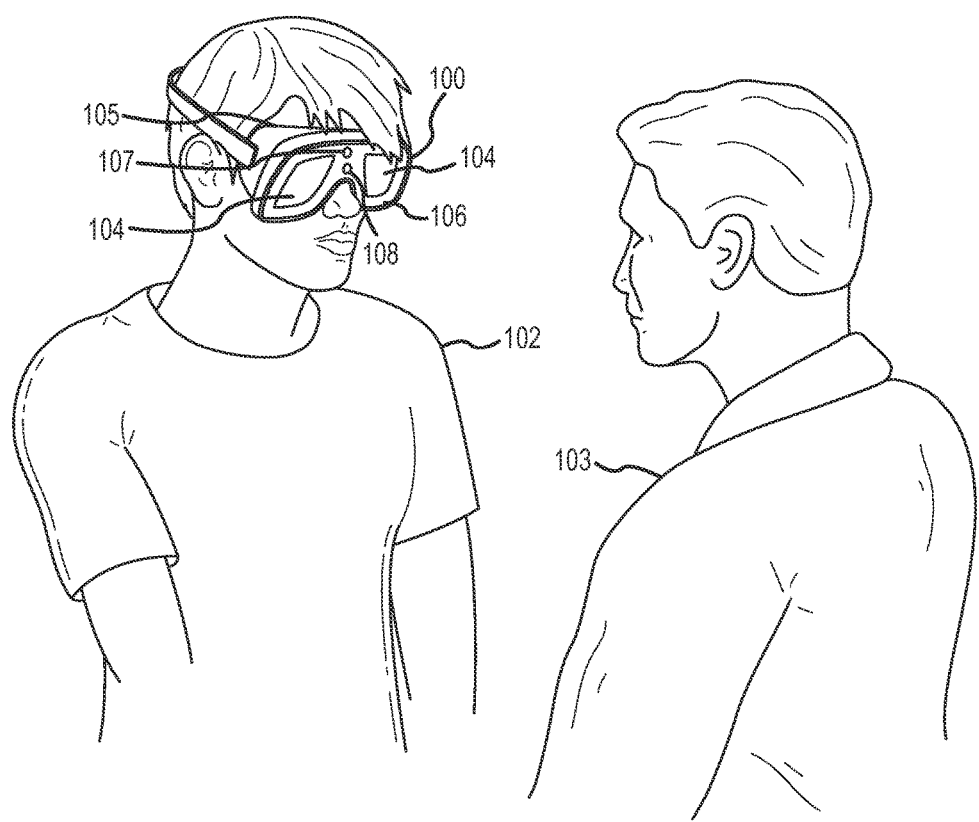
FIG. 1 is an environmental diagram illustrating a user utilizing an example heads up display device and a background.

The description that follows includes sample systems, methods, and computer program products that embody various elements of the present disclosure. However, it should be understood that the described disclosure may be practiced in a variety of forms in addition to those described herein.

Heads up display devices generally present an individual content viewing environment for users. Such heads up display devices may include a viewing apparatus (such as glasses, goggles, and so on including) that a user may mount to his head. Typically, the viewing apparatus includes one or more display elements which are configured to present visual content focused at such a distance that the visual content is comfortably viewable by a user despite the close proximity of the display element(s) to the user's eyes. The viewing apparatus may also include auditory elements which may present audio content to the user that corresponds to the visual content presented by the display element(s).

The content presentable by such a heads up display device may include television programs, movies, screens for a computing device, and so on. Heads up display devices may include components for receiving and playing content from one or more content providers (such as a satellite or cable television provider, the Internet, and so on), one or more content players (such as a digital video recorder, a television receiver, a personal computer, and so on), and so on. Heads up display devices may also include components for playing content stored in various non-transitory storage media (such as digital video discs, digital video files, and so on). Hence, a user may utilize such a heads up display device as an individual environment in which the user may view content regardless of the user's surroundings (such as on a plane, in a public park, in a shopping line, and so on) without the inconvenience of forcing others in the user's environment to also view the content. Additionally, if the content is secure and/or confidential, the user may utilize such a heads up display without exposing the content to view by an unauthorized party who happens to be in proximity to the user.

In order to avoid distracting the user from content which they have chosen to view, heads up display devices typically display visual content via the display element(s) in a non-transparent fashion such that the user views the content and not the background environment located around the heads up display device. This enables the user to concentrate on the content without being distracted by the background. However, a user may need to interact with his environment at various times while viewing content, or at least be aware of it. Generally, while the user views content, the user is required to stop the content presented by the heads up display device and remove the head mountable viewing apparatus in order to view the background environment. Once the user is done viewing the background, the user is then required to remount the head mountable viewing apparatus and restart the content. As such, the user may view either the content or the background at a given time and switching between the two is not particularly efficient or convenient.

The present disclosure discloses systems and methods for providing variable transparency heads up display devices. One or more images are transmitted to one or more display screens of a head mountable viewing device. The one or more images may be non-transparent, or opaque. An input may be received that specifies to alter the transparency of a displayed image. The input may be received from a user. The transparency of the image may be altered such that a background may be viewable through the image. The transparency may even be completely reduced such that the background is viewable and the image is not. Subsequently, the transparency of the image may again be altered to render the image opaque such that the background is not visible through the image, render the image to a particular transparency such that the background is viewable through the image, render the image completely transparent such that the background is viewable but the image is not, and so on. In this way a user may efficiently and simply switch between viewing presented content, the background, and/or combinations thereof without removing the head mountable viewing device and possibly without pausing or stopping the content if the user so desires.

FIG. 1 is a environmental diagram illustrating an user 102 utilizing an example heads up display device 100 and a background 103 which includes a person. As illustrated, the heads up display device constitutes a head mounted viewing apparatus that includes a pair of display screens 104 for displaying content to the user. As illustrated, the head mounted viewing apparatus has a first surface 105 located on a side of the head mounted viewing apparatus facing the user's eyes and a second surface 106 located on a side of the head mounted viewing apparatus opposite the user's eyes and facing the background. Also as illustrated, the display screens are disposed such that they project through both the first and second surfaces of the head mounted viewing apparatus.

In this example heads up display device, the display screens may be LCD devices which utilize LCD shutter technology. As such, the heads up display device may control the display screens to render them opaque and display visual content for the user on the surfaces of the display screens corresponding to the first surface. Further, the heads up display device may control the display screens to render them partially transparent such that the user can still view the content, but can also see through the content and display screens to view the background. The heads up display device may control the screens to various levels of transparency. Additionally, the heads up display device may control the display screens to render them completely transparent such that the content is completely transparent. Thus, the user would be unable to see the content but would be able to view the background. The example heads up display device may also include one or more illumination elements 107 which may function to illuminate the background. The illumination elements may be activated by one or more light sensors 108 such that the illumination elements only illuminate the background when the illumination is below a threshold value (such as when the background is dark, dimly illuminated, and so on).

Figure 2:
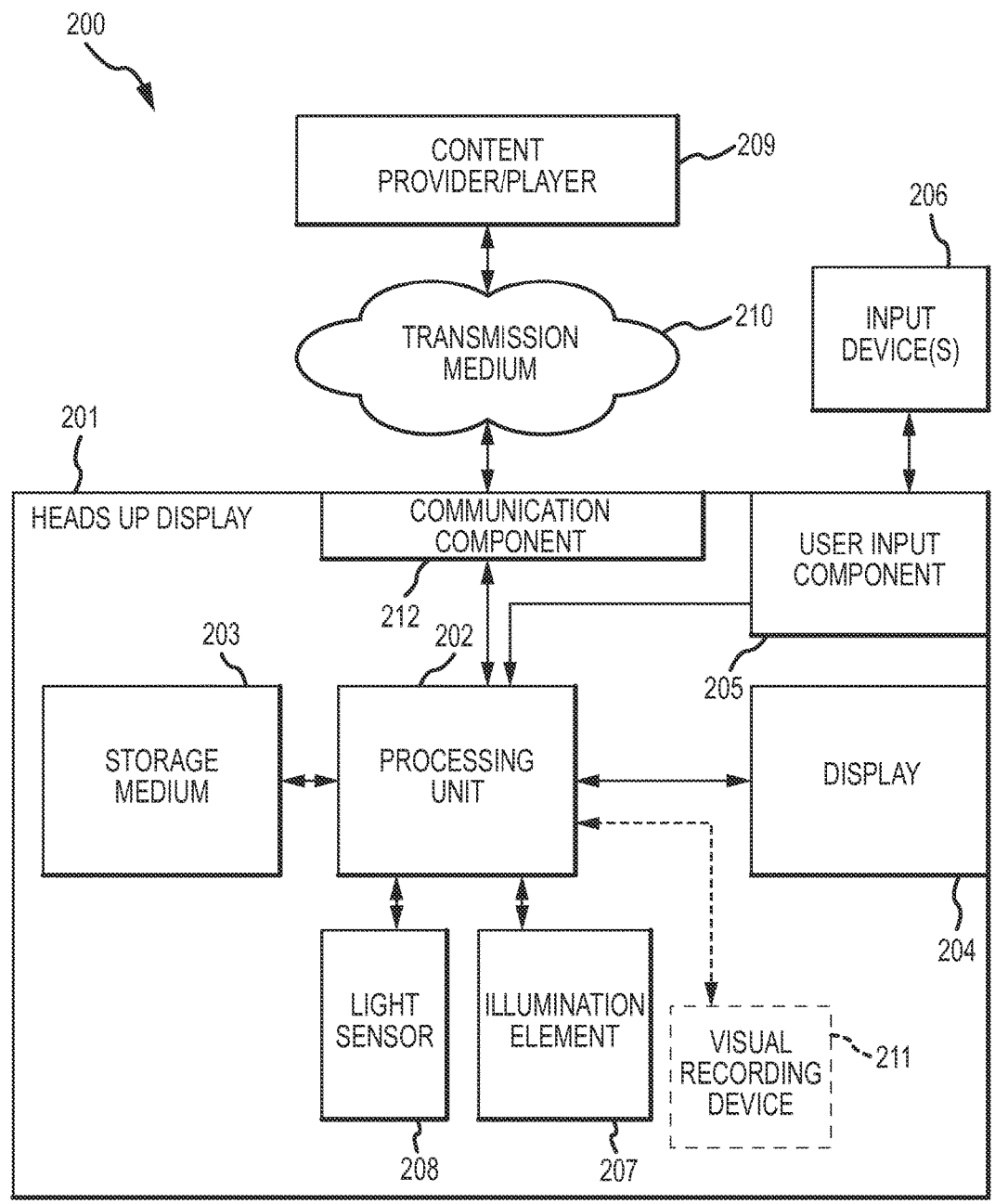
FIG. 2 is a block diagram illustrating a system for variable transparency in a heads up display.

FIG. 2 is a block diagram illustrating a system 200 for variable transparency in a heads up display. The system 200 includes a heads up display 201 and one or more input devices 206 (such as one or more keyboards, buttons, mice, joysticks, and so on). Although the input devices are illustrated as separate from the heads up display, it should be understood that in some implementations the input devices may be incorporated into the heads up display. The system may also include one or more content providers and/or content players 209 coupled to the heads up display via one or more wired and/or wireless transmission media 210.

The heads up display 201 may include one or more processing units 202, storage media 203 (which may be any non-transitory machine-readable storage media), and one or more displays 204. The heads up display may be configured in an arrangement like that illustrated in FIG. 1. The processing unit 202 may execute instructions stored in the storage medium to transmit one or more images to the display. The display may present the image to a user as opaque or non-transparent so that the user cannot see a background located on the opposite side of the heads up display from where the image is presented. The processing unit may receive input that specifies to alter the transparency of the image. The input may be received from a user via the input device 206 and a user interface component 205. In response to such input, the processing unit may alter the transparency of the image transmitted to the display. The processing unit may alter the transparency of the image such that the background is viewable through the image. The processing unit may also alter the transparency of the image to be completely transparent such that the background is viewable but the image is not. Subsequently, the processing unit may receive input to again alter the transparency of the image and in response the processing unit may render the image opaque or non-transparent, partially transparent such that the background is viewable through the image, completely transparent such that the background is viewable and the image is not, and so on.

The heads up display 201 may also include one or more illumination elements 207 (sight as incandescent bulbs, light emitting diodes, organic light emitting diodes, and so on) which may function to illuminate the background. In some implementations, the illumination elements may include infra red illumination elements. The illumination elements may be activated by one or more light sensors 208 (such as one or more photoelectric sensors and so on) such that the illumination elements only illuminate the background when the illumination is below a threshold value (such as when the background is dark, dimly illuminated, and so on).

Figure 3A:
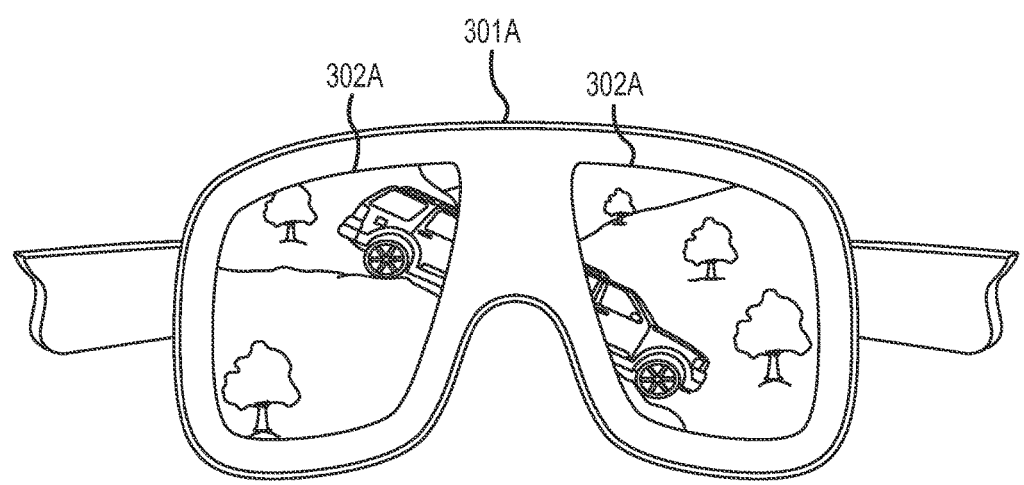
FIGS. 3A-3C illustrate sample views that a user may view utilizing a heads up display. A user may view the sample views utilizing the heads up display of FIG. 2.
Figure 3B:
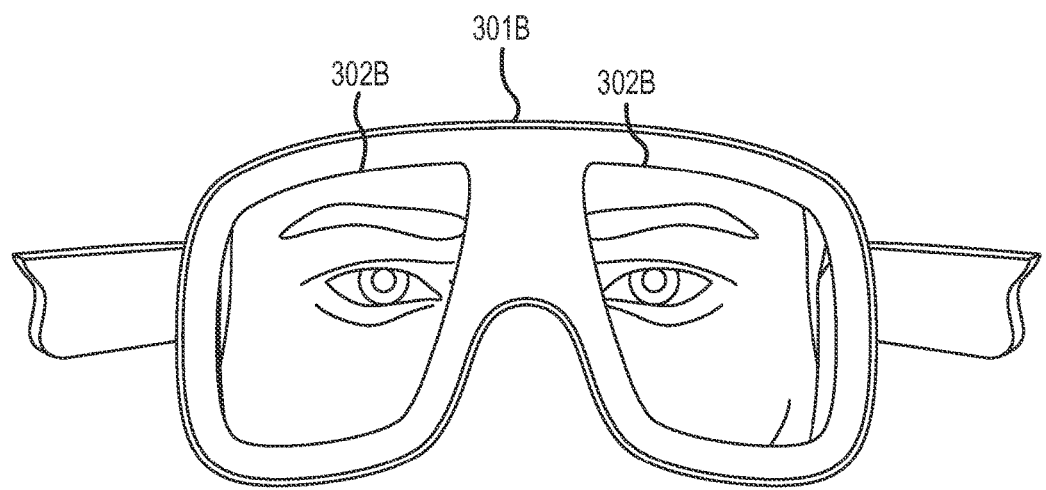
Figure 3C:
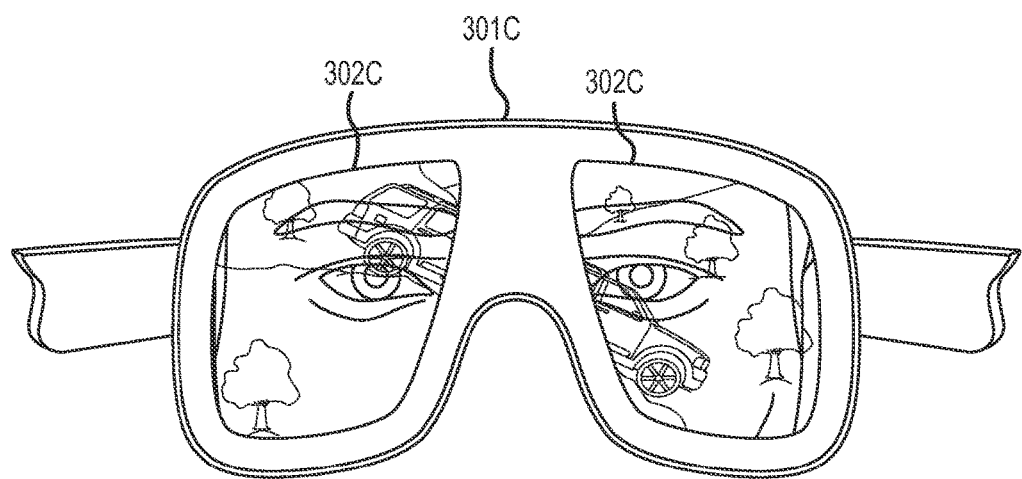

By way of example, FIGS. 3A-3C illustrate sample views that a user may view utilizing a heads up display device 301A-301C such as the heads up display 201 of FIG. 2. In this example, the user may be utilizing the heads up display device 301A-301C while seated on an airplane. FIG. 3A illustrates the heads up display device 301A displaying images of a movie on screens 302A. As illustrated, no background is viewable through the images displayed by screens 302A. In contrast, FIG. 3B illustrates the heads up display device 301B displaying the background behind screens 302B. As illustrated, the background is viewable through screens 302B but the images previously displayed are not. Also as illustrated, the background illustrates a person who may be a flight attendant that the user may need to interact with. In contrast to FIGS. 3A and 3B, FIG. 3C illustrates the heads up display device 301C displaying images of a movie on screens 302AC and the background behind screens 302C. As Illustrated, the images are partially transparent such that the background is viewable through the images and screens 302C. Thus, the user may be able to still watch the movie while simultaneously interacting with the flight attendant.

Figure 4:
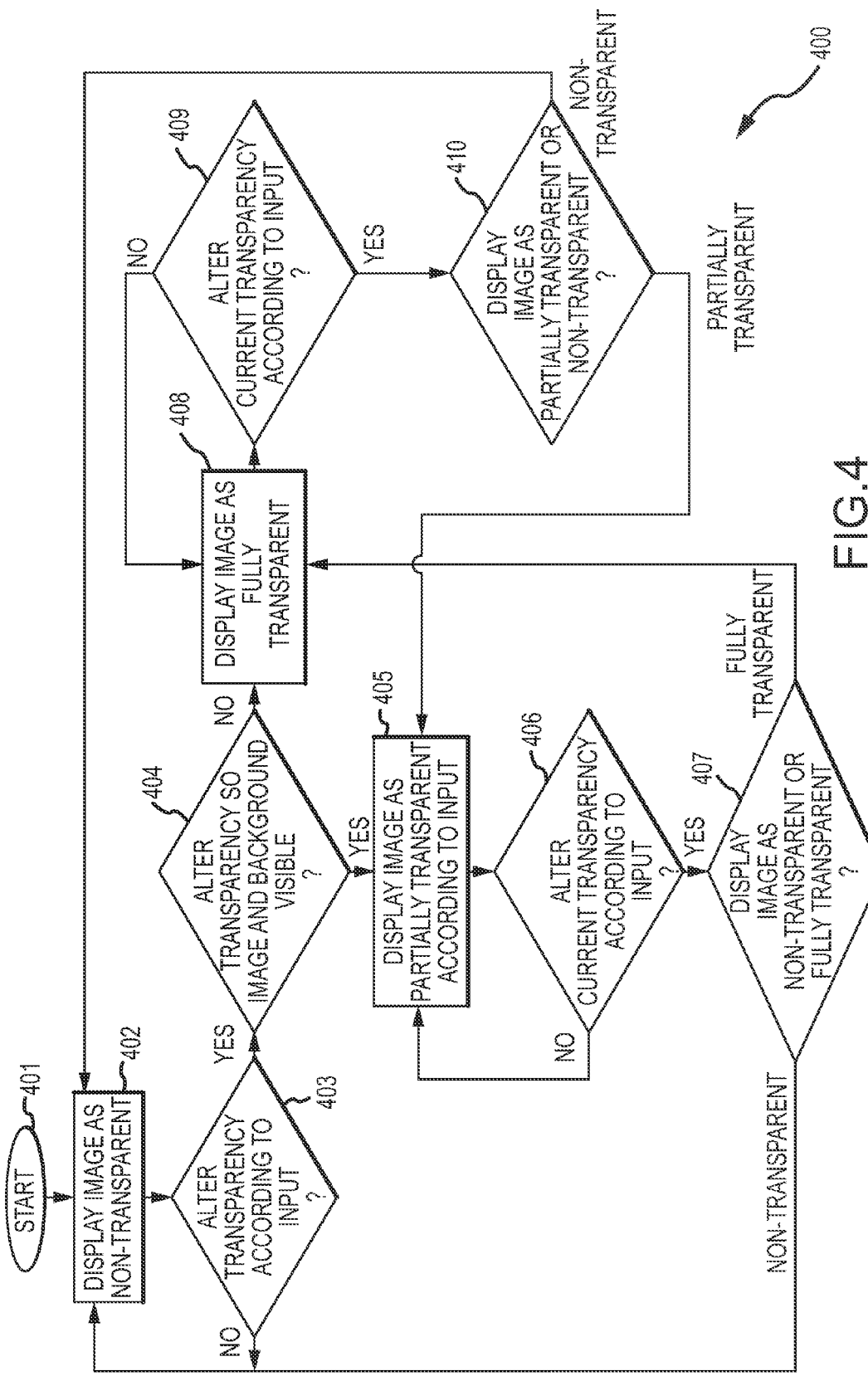
FIG. 4 is a flow chart illustrating a method for varying transparency of a heads up display. This method may be performed by the system of FIG. 2.

FIG. 4 illustrates a method 400 for varying transparency of a heads up display. The method 400 may be performed by the heads up display 201 of FIG. 2. The flow begins at block 401 and proceeds to block 402 where the heads up display displays images as non-transparent or opaque. The flow then proceeds to block 403 where the heads up display determines whether input has been received specifying to alter the transparency of the images. If so, the flow proceeds to block 404. Otherwise, the flow returns to block 402 where the heads up display continues displaying the images as non-transparent or opaque.

At block 404, after the heads up display receives input specifying to alter transparency (which may be received from a user), the heads up display determines whether the input specifies to alter the transparency such that both the images and the background are viewable or just the background. If the input specifies both the images and the background, the flow proceeds to block 405. However, if the input specifies just the background, the flow proceeds to block 408.

At block 405, the heads up display displays the images as partially transparent such that the background is viewable through the images. The heads up display may display the images at a level of transparency specified by the input. The flow then proceeds to block 406 where the heads up display determines whether input has been received specifying to alter the transparency of the images. If so, the flow proceeds to block 407. Otherwise, the flow returns to block 405 where the heads up display continues displaying the images as partially transparent. At block 407, after the heads up display determined at block 406 that input was received, the heads up display determines whether the input specified to alter the transparency such that the images or the background are viewable. If the input specifies the images, the flow proceeds to block 402 where the heads up display displays images as non-transparent or opaque. Otherwise, if the input specifies the background, the flow proceeds to block 408.

At block 408, the heads up display displays images as completely transparent such that the background is viewable and the images are not. The flow then proceeds to block 409 where the heads up display determines whether input has been received specifying to alter the transparency of the images. If so, the flow proceeds to block 410. Otherwise, the flow returns to block 408 where the heads up display continues displaying the images as completely transparent. At block 410, after the heads up display determined at block 409 that input was received, the heads up display determines whether the input specified to alter the transparency such that such that both the images and the background are viewable or just the images. If the input specifies the images, the flow proceeds to block 402 where the heads up display displays images as non-transparent or opaque. Otherwise, the flow proceeds to block 405 where the heads up display displays the images as partially transparent such that the background is viewable through the images.

Returning to FIG. 2, in a first implementation, the display 204 may include one or more LCD devices which utilize LCD shutter technology and display the images transmitted by the processing unit 202. As such, the processing unit may transmit the images to the LCD devices and control the transparency of the LCD devices. The processing unit may control the transparency of the LCD devices such that the LCD devices are non-transparent or opaque and thus the images are non-transparent or opaque, partially transparent such that the images and a background behind the LCD devices are visible through the images and the LCD devices, and fully transparent such that the background and not the images is visible through the LCD devices.

In a second implementation, the display 204 may include one or more LCD devices which utilize LCD shutter technology and one or more image projectors (such as one or more LCD projectors and so on) (not shown) that project the images transmitted by the processing unit 202 onto the LCD devices. Such image projectors may be arranged on the heads up display 201 such that the project the images onto a surface of the LCD screens facing the user's eyes (such as a surface corresponding to first surface 105 in FIG. 1). The processing unit may control the transparency of the LCD devices that operate as projection screens for the images projected by the image projectors. The processing unit may control the transparency of the LCD devices such that the images are projected onto the non-transparent or opaque LCD devices and thus the images are non-transparent or opaque, partially transparent such that the images are projected onto the partially transparent LCD devices and a background behind the LCD devices is visible through the resulting partially transparent images and the partially transparent LCD devices, and fully transparent such that the images are projected through the fully transparent LCD devices and the background without the images is visible through the fully transparent LCD devices.

In a third implementation, the heads up display 201 may be configured differently than the heads up display 100 shown in FIG. 1 such that the display 204 does not project through the heads up display from a surface facing the user's eyes (such as first surface 105 illustrated in FIG. 1) to an opposing surface facing the background (such as second surface 106 illustrated in FIG. 1). Instead, the display 204 may be a display device that is disposed only on a surface of the heads up display facing the user's eyes and displays images transmitted by the processing unit 202. Thus, the user cannot physically look through the display device at a background behind the display device, regardless of any transparency of any images or the display device. In this implementation the heads up display 201 may also include one or more visual recording devices 211 (such as one or more digital video recorders, one or more digital cameras, one or more charge-coupled devices, and so on). The visual recording device may be disposed on the heads up display such that they record images of the background, such as on the surface of the heads up display facing the background (similar to the second surface 106 illustrated in FIG. 1).

In this third implementation, the processing unit 202 may receive the background images from the visual recording device and combine it with the images to transmit to the display. If multiple visual recording devices are utilized, the processing unit may combine the background images recorded by each of the visual recording devices to allow for a larger field of view than is each individual visual recording device is capable of. The processing unit 202 may combine the background images with the images to transmit to the display such that the background image is not viewable in the combination if the images to transmit are non-transparent or opaque, the background image is viewable through the images to transmit if the images to transmit are partially transparent, or the background image is viewable and the images to transmit are not if the images to transmit are fully transparent. Additionally, in this implementation the illumination element 207 may be an infra red illumination element, such as an infra red light emitting diode. Thus, the visual recording element may perceive the infra red light emitted by the illumination element, illuminating the recorded background images, even if the light is not perceptible to other people in the background area. Hence, the background images may be illuminated without disturbing other people in the background.

In a fourth implementation, the heads up display 201 may be configured similar to the third implementation discussed above in that one or more projection screens are disposed on a surface of the heads up display facing the user's eyes. Further, the heads up display may include one or more image projectors (similar to those discussed above with respect to the second implementation) that project the images transmitted by the processing unit 202 onto the projection screens facing the user's eyes. Thus, the user cannot physically look through the projection screens at a background behind the projection screens, regardless of any transparency of any images or the projection screens. However, as discussed in the third implementation discussed above, the heads up display may include one or more visual recording devices 211 (such as one or more digital video recorders, one or more digital cameras, one or more charge-coupled devices, and so on). The visual recording device may be disposed on the heads up display such that they record images of the background, such as on the surface of the heads up display facing the background (similar to the second surface 106 illustrated in FIG. 1).

In this fourth implementation, the processing unit 202 may receive the background images from the visual recording device and combine it with the images to transmit to the display. The processing unit may combine the background images with the images to transmit to the display such that the background image is not viewable in the combination if the images to transmit are non-transparent or opaque, the background image is viewable through the images to transmit if the images to transmit are partially transparent, or the background image is viewable and the images to transmit are not if the images to transmit are fully transparent. Further in this implementation, the illumination element 207 may be an infra red illumination element, such as an infra red light emitting diode. Thus, the visual recording element may perceive the infra red light emitted by the illumination element, illuminating the recorded background images, even if the light is not perceptible to other people in the background area. Hence, the background images may be illuminated without disturbing other people in the background.

In various implementations, the heads up display may include a communication component 212 that is operable to receive content from one or more content providers (such as a satellite or cable television provider, the Internet, and so on), content players (such as a digital video recorder, a television receiver, a personal computer, and so on), and so on 209 via one or more transmission media 210. As such, the processing unit 202 may transmit images to the display 204 as part of playing content received from the one or more content providers, content players, and so on as well as playing content stored in the storage medium 203. As part of playing such content, the processing unit 202 may transmit audio to one or more audio output devices (such as speakers) (not shown). The transmission medium may be an kind of wired or wireless transmission medium such as the Internet, a satellite connection, a coaxial cable connection, an Ethernet connection, a cellular connection, a WiFi connection, and so on. The transmission medium may also include a physical medium (such as digital video disc (DVD), video cassette, compact disc (CD), CD-ROM, DVD-ROM, and so on) distribution system such as mail distribution, mail distribution, and so on. Further, although the content player is illustrated as a separate device from the heads up display, in some implementations the content player may be incorporated into the heads up display.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a: magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for providing variable transparency heads up displays, the method comprising:
    transmitting at least one image to at least one display screen of a head mountable viewing device utilizing at least one processing unit;
    illuminating, utilizing an infrared illumination element, a background located behind the at least one display screen with infrared light;

capturing, utilizing a visual recording device, a background image of the infared illuminated background;
transmitting the captured background image to the at least one display screen utilizing the at least one processing unit;
receiving an input, utilizing the at least one processing unit, that specifies to change a transparency of the at least one image; and
altering the transparency of the at least one image without altering a transparency of the at least one display screen, utilizing the at least one processing unit, such that the captured background image is viewable through the at least one image while the background is blocked from being viewed by the at least one display screen.

2. The method of claim 1, further comprising altering the transparency of the at least one image, utilizing the at least one processing unit, such that the at least one image obscures viewing of the captured background image.

3. The method of claim 1, further comprising altering the transparency of the at least one image, utilizing the at least one processing unit, such that the captured background image is viewable and the at least one image is not viewable.

4. The method of claim 1, wherein said operation of receiving an input, utilizing the at least one processing unit, that specifies to change a transparency of the at least one image comprises receiving the input from a user.

5. The method of claim 1, wherein said operation of altering the transparency of the at least one image comprises:
transmitting a combination of the at least one image and the captured background image to the at least one display screen of the head mountable viewing display such that the captured background image is viewable through the at least one image.

6. The method of claim 1, wherein said operation of capturing the background image of the background utilizing the visual recording device comprises:
recording a plurality of viewing area portion images utilizing a plurality of visual recording devices; and
combining the plurality of viewing area portion images to form the captured background image wherein a viewing area of each of the plurality of viewing area portion images is smaller than a viewing area of the captured background image.

7. The method of claim 1, wherein the at least one display screen comprises at least one liquid crystal projection screen and wherein said operation of transmitting at least one image to at least one display screen of a head mountable viewing device utilizing at least one processing unit comprises projecting the at least one image on the at least one liquid crystal projection screen.

8. The method of claim 1, further comprising illuminating the background when an illumination level of the background is below a threshold value.

9. The method of claim 8, further comprising detecting the illumination level of the background.

10. A system for a variable transparency heads up display, comprising:
a head mountable viewing display including at least one display screen;
at least one non-transitory storage medium;
an infrared illumination element configured to illuminate a background with infrared light;
a visual recording device configured to capture a background image of the infared illuminated background; and
at least one processing unit that executes instructions stored in the at least one non-transitory storage medium to transmit at least one image to the at least one display screen of the head mountable viewing display:
wherein the at least one processing unit is operable to alter a transparency of the at least one image without altering a transparency of the at least one display screen so that the captured background image is viewable through the at least one image while the background is blocked from being viewed by the at least one display screen.

11. The system of claim 10, wherein the at least one processing unit alters the transparency of the at least one image by transmitting a combination of the at least one image and the captured background image to the at least one display screen of the head mountable viewing display such that the captured background image is viewable through the at least one image.

12. The system of claim 10, wherein the visual recording device comprises a plurality of visual recording devices that record viewing area portion images wherein the captured background image comprises a combination of the viewing area portion images such that a viewing area of the captured background image is greater than a viewing area of the viewing area portion images.

13. The system of claim 10, wherein the at least one display screen comprises at least one liquid crystal display that is operable to display the at least one image transmitted by the at least one processing unit.

14. The system of claim 10, further comprising an image projector wherein the at least one display screen comprises at least one liquid crystal projection screen upon which the image projector projects the at least one image transmitted by the at least one processing unit.

15. The system of claim 10, further comprising a user input device wherein the at least one processing unit alters the transparency of the at least one image in response to user input received by the user input device.

16. The system of claim 10, wherein the infrared illumination element comprises an infra red illumination element.

17. The system of claim 10, further comprising a light sensor operable to detect an illumination level of the background wherein the infrared illumination element illuminates the background when the illumination level of the background is below a threshold value.

18. The system of claim 10, wherein the background represented by the captured background image is located behind the head mountable viewing display opposite a user of the head mountable viewing display.

19. The method of claim 1, wherein the background represented by the captured background image is located behind the head mountable viewing device opposite a user of the head mountable viewing device.

* * * * *